(12) United States Patent
Minamisawa

(10) Patent No.: US 11,184,511 B2
(45) Date of Patent: Nov. 23, 2021

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 16/827,723

(22) Filed: Mar. 24, 2020

(65) Prior Publication Data

US 2020/0314302 A1 Oct. 1, 2020

(30) Foreign Application Priority Data

Mar. 29, 2019 (JP) .............................. JP2019-067967

(51) Int. Cl.
| | |
|---|---|
| *H04N 5/225* | (2006.01) |
| *G02B 7/04* | (2021.01) |
| *G02B 27/64* | (2006.01) |
| *H04N 5/232* | (2006.01) |

(Continued)

(52) U.S. Cl.
CPC ............ *H04N 5/2254* (2013.01); *G02B 7/04* (2013.01); *G02B 27/646* (2013.01); *H04N 5/2257* (2013.01); *H04N 5/2328* (2013.01)

(58) Field of Classification Search
CPC .. H04N 5/2254; H04N 5/2257; H04N 5/2328; H04N 5/2251; H04N 5/2253; H04N 5/2256; G02B 7/04; G02B 27/646; G02B 13/001; G03B 5/02; G03B 5/04
See application file for complete search history.

(56) References Cited

U.S. PATENT DOCUMENTS

| | | |
|---|---|---|
| 6,005,723 A | 12/1999 | Kosaka et al. |
| 7,526,189 B2 | 4/2009 | Nomura et al. |
| 9,366,879 B1 | 6/2016 | Miller |

(Continued)

FOREIGN PATENT DOCUMENTS

| | | |
|---|---|---|
| CN | 105242480 | 1/2016 |
| CN | 205844606 | 12/2016 |

(Continued)

OTHER PUBLICATIONS

Office Action of China Counterpart Application, with English translation thereof, dated May 8, 2021, pp. 1-15.

*Primary Examiner* — Albert H Cutler
(74) *Attorney, Agent, or Firm* — JCIPRNET

(57) ABSTRACT

An optical unit includes a movable body including an optical module, a fixed body configured to displaceable hold the movable body, and a support mechanism including a gimbal frame configured to rotatably support the movable body with respect to the fixed body around a first axial line intersecting with an optical axis direction of the optical module. The support mechanism rotatably supports the movable body, to the fixed body via a first support unit, around the first axial line. The first support unit includes a first rod-like support member fixed to one of the fixed body and the gimbal frame, and a first contact unit being provided in the other of the fixed body and the gimbal frame and contacting the first rod-like support member. The first rod-like support member includes a first leading end, the first leading end contacting and being elastically pressed against the first contact unit.

9 Claims, 9 Drawing Sheets

(51) Int. Cl.
*G03B 5/02* (2021.01)
*G03B 5/04* (2021.01)

(56) References Cited

U.S. PATENT DOCUMENTS

| | | | |
|---|---|---|---|
| 9,541,769 B2 | 1/2017 | Ladwig et al. | |
| 10,067,357 B2 | 9/2018 | Ladwig et al. | |
| 10,104,293 B2 | 10/2018 | Sekimoto | |
| 10,139,647 B2 | 11/2018 | Miller | |
| 10,261,335 B2 | 4/2019 | Terajima | |
| 10,353,216 B2 | 7/2019 | Minamisawa et al. | |
| 10,775,638 B2 | 9/2020 | Miller et al. | |
| 10,845,611 B2 | 11/2020 | Minamisawa | |
| 10,969,602 B2 | 4/2021 | Ladwig et al. | |
| 2010/0063361 A1* | 3/2010 | Kuchimaru | A61B 1/00096 600/168 |
| 2013/0107112 A1* | 5/2013 | Oh | H04N 5/2257 348/374 |
| 2015/0043077 A1* | 2/2015 | Nakayama | G02B 27/646 359/557 |
| 2015/0103195 A1* | 4/2015 | Kwon | G03B 3/10 348/208.12 |
| 2015/0319378 A1* | 11/2015 | Hoelter | H04N 5/2252 348/164 |
| 2016/0341974 A1* | 11/2016 | Kishine | G02B 7/08 |
| 2017/0171469 A1* | 6/2017 | Sekimoto | H04N 5/23287 |
| 2018/0246342 A1* | 8/2018 | Miller | H04N 5/23216 |
| 2019/0162982 A1 | 5/2019 | Miller | |

FOREIGN PATENT DOCUMENTS

| | | |
|---|---|---|
| CN | 106353950 | 1/2017 |
| CN | 106462028 | 2/2017 |
| CN | 107003537 | 8/2017 |
| CN | 108693655 | 10/2018 |
| JP | 4684771 | 5/2011 |
| JP | 2012156630 | 8/2012 |
| JP | 2017021332 | 1/2017 |

\* cited by examiner

FIG. 1

OPTICAL UNIT

CROSS-REFERENCE TO RELATED APPLICATION

This application claims the priority benefit of Japan Application No. 2019-067967, filed on Mar. 29, 2019. The entirety of the above-mentioned patent application is hereby incorporated by reference herein and made a part of this specification.

BACKGROUND

Field of the Invention

At least an embodiment of the present invention relates to an optical unit mounted in a camera-equipped mobile phone or the like.

Description of the Related Documents

An example of this type of optical unit includes an optical unit described in Japanese Unexamined Patent Application Publication No. 2017-21332. In this optical unit, a movable body including an optical module is displaceably supported, via a support mechanism including a gimbal frame, with respect to a fixed body. A structure of a support unit configured to support the movable body is obtained by fixing a ball to a bearing portion of the gimbal frame by welding or the like. Alternatively, a support unit may be employed in which a convex curved surface is formed by being pressed instead of welding a ball.

This optical unit has a function for correcting pitching (vertical shake) and yawing (lateral shake).
[Patent Literature 1]
Japanese Unexamined Patent Application Publication No. 2017-21332

In the conventional optical unit, the support unit configured to support the movable body has a structure in which the ball is fixed to the bearing portion of a gimbal mechanism by welding or the like, and thus, if the ball is small, it is highly difficult to assemble the support unit, which is a problem. Further, if the convex curved surface is formed by being pressed instead of welding the ball, the convex curved surface is formed by being pressed, and thus, there is a problem that it is difficult to enhance the accuracy of the convex curved surface, and a crack may occur.

An object of at least an embodiment of the present invention is to improve the assembly workability of a support unit configured to displaceably support a movable body including an optical module in an optical unit.

SUMMARY

To resolve the above problems, an optical unit according to at least an embodiment of the present invention includes a movable body including an optical module, a fixed body configured to displaceably hold the movable body, and a support mechanism including a gimbal frame configured to rotatably support the movable body with respect to the fixed body around a first axial line intersecting with an optical axis direction of the optical module, in which the support mechanism rotatably supports the movable body around the first axial line with respect to the fixed body via a first support unit, the first support unit includes a first rod-like support member fixed to one of the fixed body and the gimbal frame, and a first contact unit being provided in the other of the fixed body and the gimbal frame and contacting the first rod-like support member, and the first rod-like support member includes a first leading end, the first leading end contacting in the state of being elastically pressed against the first contact unit.

According to such an aspect, the first support unit configured to rotatably support the movable body around the first axial line with respect to the fixed body includes a first rod-like support member fixed to one of the fixed body and the gimbal frame, and a first contact unit being provided in the other of the fixed body and the gimbal frame and contacting the first rod-like support member. Thus, with a structure in which, instead of welding a conventional ball, the rod-like support member is fixed at a predetermined location, fixing is easy by using the rod-like portion, and thus, the assembly workability is improved.

In addition, a fulcrum of the support used when the movable body is displaced with respect to the fixed body can be manufactured by processing a leading end of the rod-like member into a desired shape, and thus, the manufacturability is improved.

According to at least an embodiment of the present invention, in the optical unit, it is further preferable that the support mechanism rotatably supports the movable body around a second axial line intersecting with the optical axis direction and the first axial line direction, with respect to the gimbal frame, via a second support unit, the second support unit includes a second rod-like support member fixed to one of the movable body and the gimbal frame, and a second contact unit being provided in the other of the movable body and the gimbal frame and contacting the second rod-like support member, and the second rod-like support member includes a second leading end, the second leading end contacting in the state of being elastically pressed against the second contact unit.

According to such an aspect, the second support unit configured to rotatably support the movable body around the first axial line with respect to the gimbal frame includes a second rod-like support member fixed to one of the movable body and the gimbal frame, and a second contact unit being provided in the other of the movable body and the gimbal frame and contacting the second rod-like support member. Thus, in the second support unit between the movable body and the gimbal frame similarly to the first support unit, fixing is easy by using the rod-like portion, and thus, the assembly workability is improved.

According to at least an embodiment of the present invention, in the optical unit, it is further preferable that the rod-like support member includes a flange at a base end.

According to such an aspect, the rod-like support member includes the flange at the base end. Thus, if the rod-like support member is bonded and fixed, an adhesive area is increased, and as a result, an adhesive strength can be increased.

According to at least an embodiment of the present invention, in the optical unit, it is further preferable that the rod-like support member includes an extending unit extending from a base end toward a leading end, and the extending unit includes a restricting unit configured to restrict a range in which the gimbal frame is displaced with respect to the contact unit in a direction intersecting with the direction in which the extending unit extends.

According to such an aspect, the extending unit of the rod-like support member includes the restricting unit configured to restrict a range in which the extending unit of the rod-like support member is displaced with respect to the contact unit in a direction intersecting with the extending direction of the extending unit. Consequently, if an impact is applied to the optical unit, it is possible to prevent a case where the support unit is removed so that the movable body and the support mechanism are dropped.

Further, when the length or the fixing position of the extending unit is adjusted, a pressurization in the support mechanism can be easily adjusted.

According to at least an embodiment of the present invention, in the optical unit, it is preferable that the leading end of the rod-like support member has a convex curved surface shape, and a distance in a direction in which the extending unit extends between the contact unit and the restricting unit is equal to or larger than a radius of curvature of the convex curved surface.

According to such an aspect, the distance in a direction in which the extending unit extends between the contact unit and the restricting unit is equal to or less than a radius of curvature of a convex curved surface of the leading end. Consequently, if an impact is applied to the optical unit, it is possible to prevent the rod-like support member from being removed even from the restricting unit.

According to at least an embodiment of the present invention, in the optical unit, it is further preferable that the leading end of the rod-like support member has a convex curved surface shape, the contact unit has a concave curved shape, a radius of curvature of the concave curved surface is larger than a radius of curvature of the convex curved surface, and a gap between the restricting unit and the extending unit of the rod-like support member is smaller than a radius of a circle of an opening edge of the concave curved surface.

According to such an aspect, a gap between the restricting unit and the extending unit of the rod-like support member is smaller than a radius of a circle of an opening edge of the concave curved surface of the contact unit. Consequently, even if an impact is applied to the optical unit to bring the rod-like support member into contact with the restricting unit, it is possible to prevent the rod-like support members from being removed from the concave curved surfaces.

According to at least an embodiment of the present invention, in the optical unit, it is further preferable that the contact unit includes a reinforcement unit around an opening edge of the concave curved surface of the contact unit.

According to such an aspect, the reinforcement unit can enhance a strength of the concave curved surface of the contact unit.

In at least an embodiment of the present invention, in the optical unit, it is further preferable that the contact unit and the restricting unit are formed as an integrated member.

According to such an aspect, the contact unit and the restricting unit are formed as the integrated member, and thus, the number of components can be reduced.

According to at least an embodiment of the present invention, in the optical unit, it is further preferable that the extending unit of the rod-like support member has a column-like shape, and the restricting unit has an annular shape.

According to such an aspect, the extending unit of the rod-like support member has a column-like shape, and the restricting unit has an annular shape. As a result, distances between the rod-like support member and the restricting positions of the restricting unit are equal in all directions, and thus, the regulation can provide an equal effect of preventing removal in all the directions.

According to at least an embodiment of the present invention, in the optical unit, it is further preferable that the fixed body is arranged to surround the gimbal frame.

According to such an aspect, the fixed body is arranged to surround the gimbal frame. Thus, a structure is employed in which the pressurization of the support mechanism can be adjusted from the fixed body side, and thus, the pressurization can be easily adjusted.

According to at least an embodiment of the present invention, it is possible to improve the assembly workability of a support unit configured to displaceably support a movable body including an optical module in an optical unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a perspective view illustrating an optical unit according to a first embodiment of the present invention;

DETAILED DESCRIPTION

Figure 2:
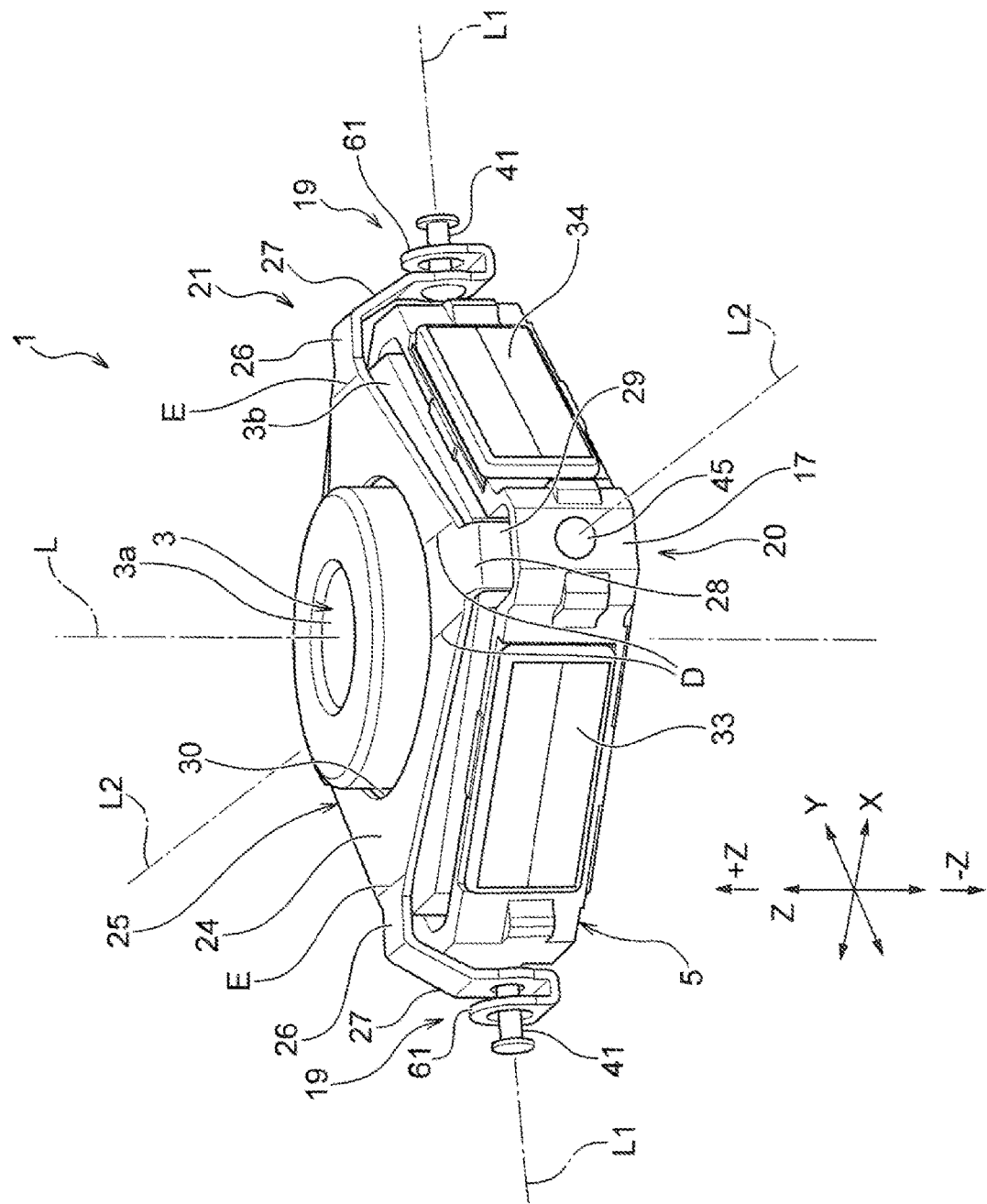
FIG. 2 is a perspective view illustrating a state where a fixed body and a flexible wiring board are removed according to the first embodiment of the present invention.

An optical unit according to at least an embodiment of the present invention will be described in detail below, based on a first embodiment illustrated in FIG. 1 to FIG. 8 and a second embodiment illustrated in FIG. 9.

First Embodiment

Figure 1:
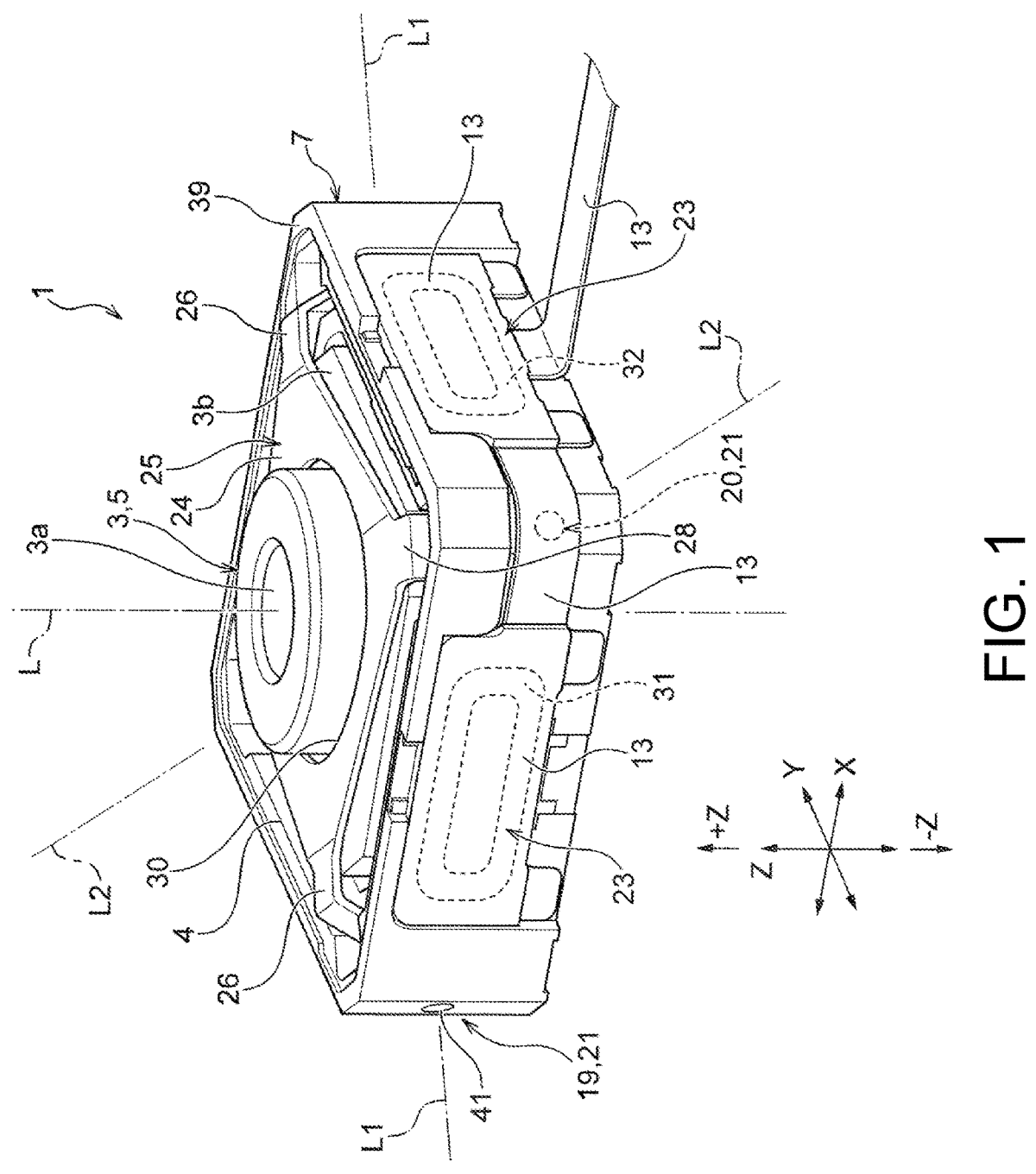

General Description of Optical Unit (see FIG. 1)

An optical unit 1 according to a first embodiment is an optical unit having a function for correcting at least pitching (vertical shake) and yawing (lateral shake), in an optical module 3. The optical module 3 is used, for example, as a thin camera mounted on a camera-equipped mobile phone, a tablet PC, or the like. The optical unit 1 mainly includes an actuator portion for holding the optical module 3 and correcting a shake in a pitching direction Y and in a yawing direction X generated in the optical module 3.

A specific configuration of the optical unit 1 will be described in detail below.

Specific Configuration of Optical Unit (see FIG. 1 to FIG. 8)

The optical unit 1 according to the first embodiment includes a movable body 5 including the optical module 3, a fixed body 7 configured to hold the movable body 5 to surround the movable body 5 in a manner to be displaceable in the pitching (vertical shake) direction Y and in the yawing (lateral shake) direction X, and a support mechanism 21 including a gimbal frame 25 configured to rotatably support the movable body 5 with respect to the fixed body 7 around a first axial line L1 intersecting with an optical axis direction L of the optical module 3. The support mechanism 21 rotatably supports the movable body 5, with respect to the fixed body 7 via a first support unit 19, around the first axial line L1.

In the first embodiment, the support mechanism 21 further rotatably supports the movable body 5 around a second axial line L2 intersecting with the optical axis direction L and the first axial line direction L1, with respect to the gimbal frame 25, via a second support unit 20.

Figure 4:
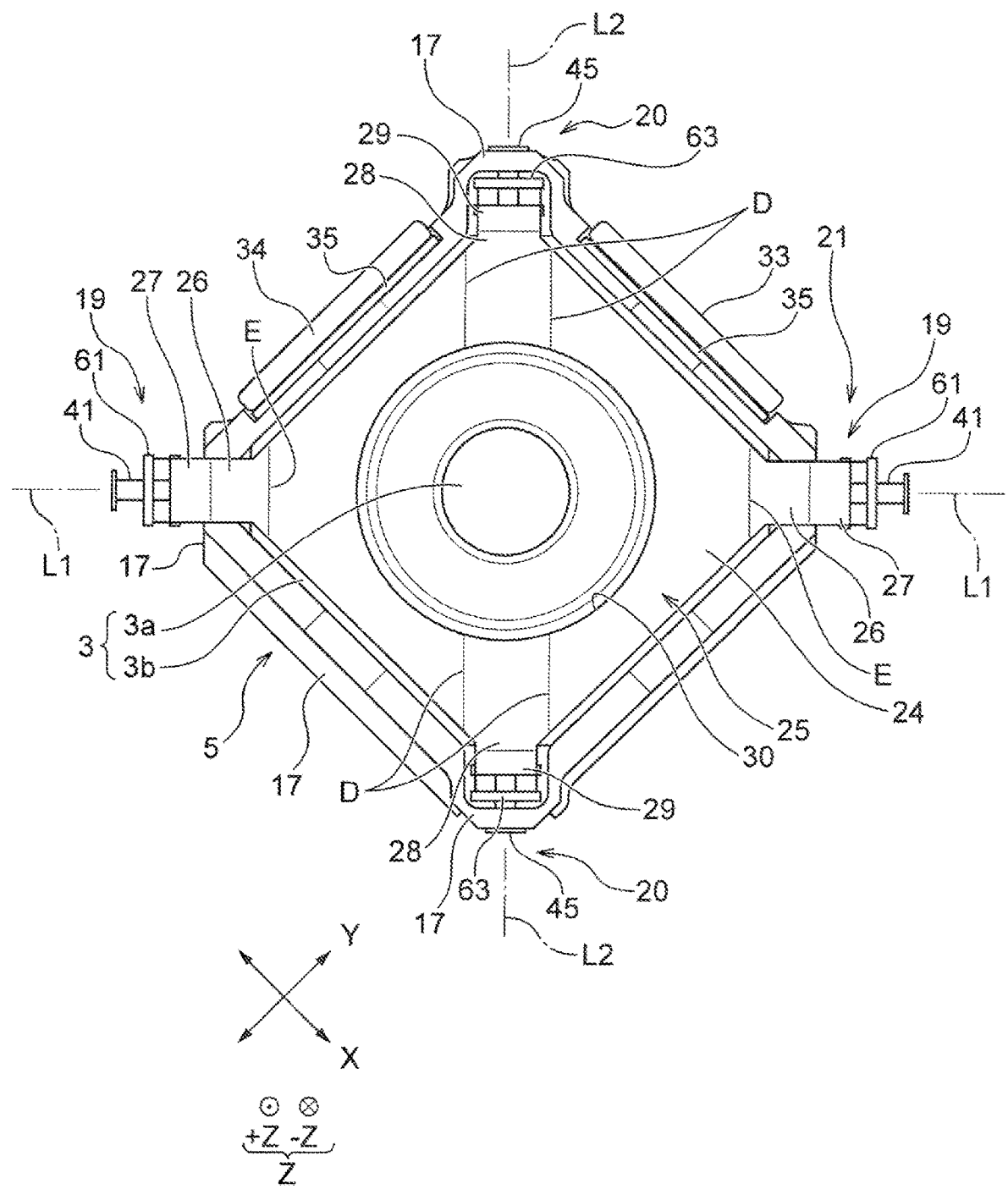
FIG. 4 is a plan view illustrating the same state as that of FIG. 2.

Further, in the first embodiment, a shake correction drive mechanism 23 configured to drive the movable body 5 around the first axial line L1 and the second axial line L2, is provided. The shake correction drive mechanism 23 is configured to correct a posture of the movable body 5 and includes a pair of correction coils 31 and 32 and magnets 33 and 34. The correction coils 31 and 32 are provided on a side of the fixed body 7, as illustrated in FIG. 1, and the magnets 33 and 34 are mounted on a side of the movable body 5, as illustrated in FIG. 2. In FIG. 4, reference numeral 35 denotes a yoke.

Pitching and yawing of the movable body 5 are corrected by the correction coils 31 and 32 and the magnets 33 and 34. In FIG. 1, reference numeral 13 denotes a flexible wiring board.

Movable Body

As illustrated in FIG. 2 to FIG. 6, the movable body 5 includes the optical module 3 and a frame body 17 configured to hold the optical module 3, the frame body 17 is to be mounted with the magnets 33 and 34 for detecting and correcting pitching and yawing.

The optical module 3 includes a lens 3a at a subject side +Z, and incorporates an optical device and the like for capturing an image inside a housing 3b having a rectangular housing shape. The frame body 17 is a rectangular frame shaped member provided to surround the remaining four surfaces of the optical module 3 excluding a front surface on which the lens 3a is provided and a rear surface on the side opposing to the front surface. The magnets 33 and 34 for detecting pitching and yawing are mounted on two outer surfaces of the frame body 17.

Fixed Body

As illustrated in FIG. 1, the fixed body 7 is assembled into an outer casing 39, and there are placed the correction coils 31 and 32 for pitching and yawing together with the flexible wiring board 13 in the outer casing 39. In the first embodiment, as illustrated by a broken line in FIG. 1, the correction coils 31 and 32 are arranged on a back side of the flexible wiring board 13 and at positions corresponding to the magnets 33 and 34.

The outer casing 39 is structured so that a window unit 4 is provided on a front surface at the subject side +Z, and a rear surface at a −Z side opposing to the subject side is opened, and is a rectangularly shaped container-like member larger by one size than the optical module 3.

Support Mechanism with Gimbal Frame

As illustrated in FIG. 2 to FIG. 6, the support mechanism 21 includes the gimbal frame 25 having a spring property, and the gimbal frame 25 is formed by bending a metal flat plate material. In the first embodiment, the gimbal frame 25 is arranged at the subject side +Z of the optical module 3, and a circular opening unit 30 is formed at the center of a base frame 24 on a light entrance side of the optical module 3. The gimbal frame 25 is generally formed in an X shape while including the base frame 24 having a rectangular frame shape, where the opening unit 30 is formed at a center of the base frame 24, a first extending unit 26 extending from four corners of the base frame 24 into a first axial line L1 direction around the optical axis L, and a second extending unit 28 extending in a second axial line L2 direction.

In the first embodiment, the gimbal frame 25 is configured such that the first extending unit 26 and the second extending unit 28 positioned to form the X shape extend in extending directions of the first extending unit 26 and the second extending unit 28, and a first-support-unit extending unit 27 and a second-support-unit extending unit 29 are respectively formed by bending the leading ends of the first extending unit 26 and the second extending unit 28 into a direction along the optical axis direction L. The first support unit 19 is provided in the first-support-unit extending unit 27 and the second support unit 20 is provided in the second-support-unit extending unit 29.

Figure 3:
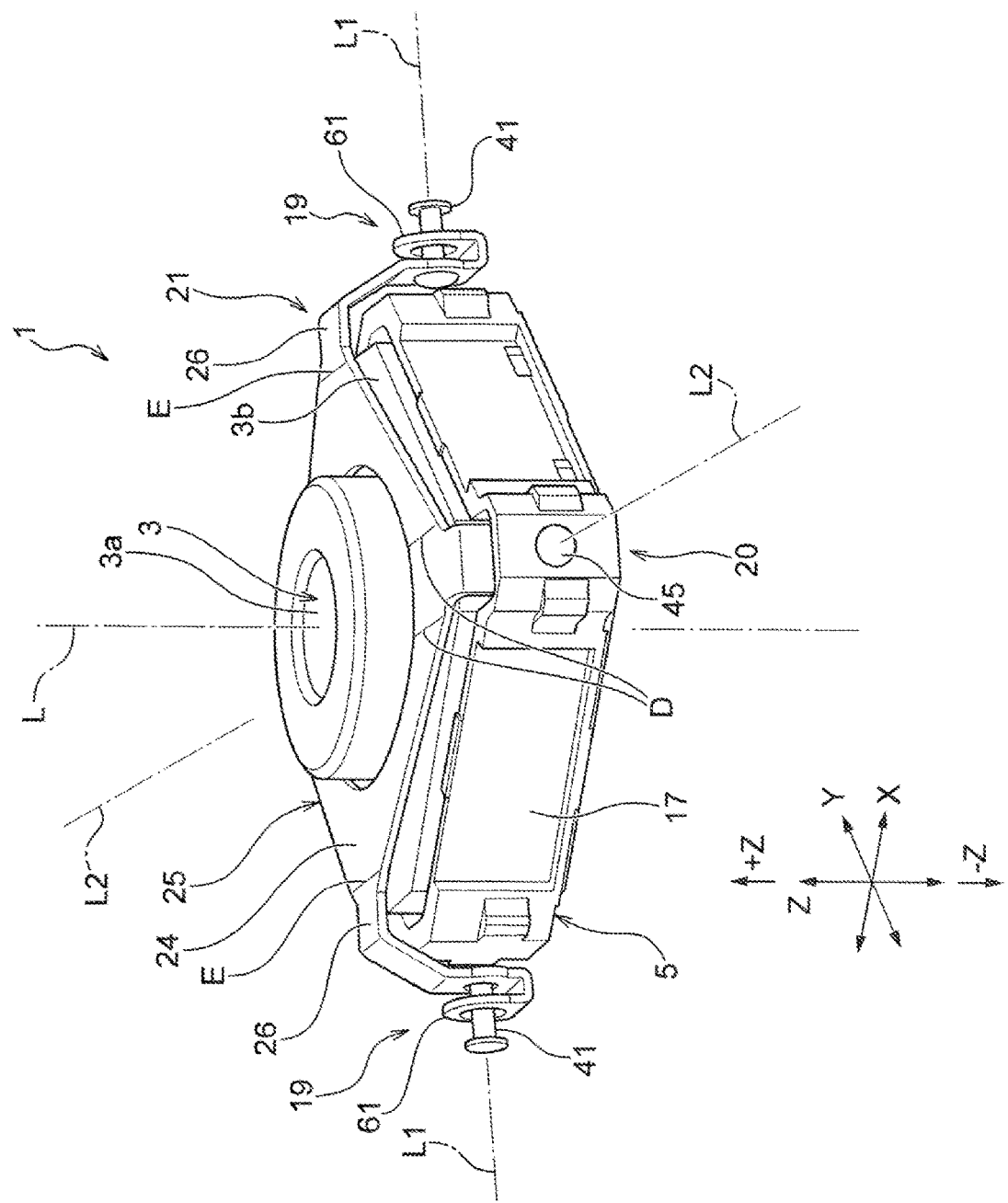
FIG. 3 is a perspective view illustrating a state where a magnet is removed from FIG. 2.

Further, as illustrated in FIG. 2 to FIG. 4, the gimbal frame 25 is configured such that a gap in the optical axis direction L between the first extending unit 26 and the movable body 5 is formed to be larger than a gap in the optical axis direction L between the second extending unit 28 and the movable body 5. In other words, the gimbal frame 25 is configured such that when the gimbal frame 25 is bent along broken lines D and E so that a height of the leading end of the first extending unit 26 in the optical axis direction +Z is greater than a height of the leading end of the second extending unit 28 in the optical axis +Z, that is, the gimbal frame 25 is formed to be higher than the movable body 5.

It is noted that the first-support-unit extending unit 27 and the second-support-unit extending unit 29 may not necessarily be all plate-shaped, and only a part thereof may be plate-shaped to provide a spring property. Further, one of the first-support-unit extending unit 27 and the second-support-unit extending unit 29 may be formed in a shape (for example, a rod shape) other than a plate shape.

First Support Unit and Second Support Unit

Figure 7:
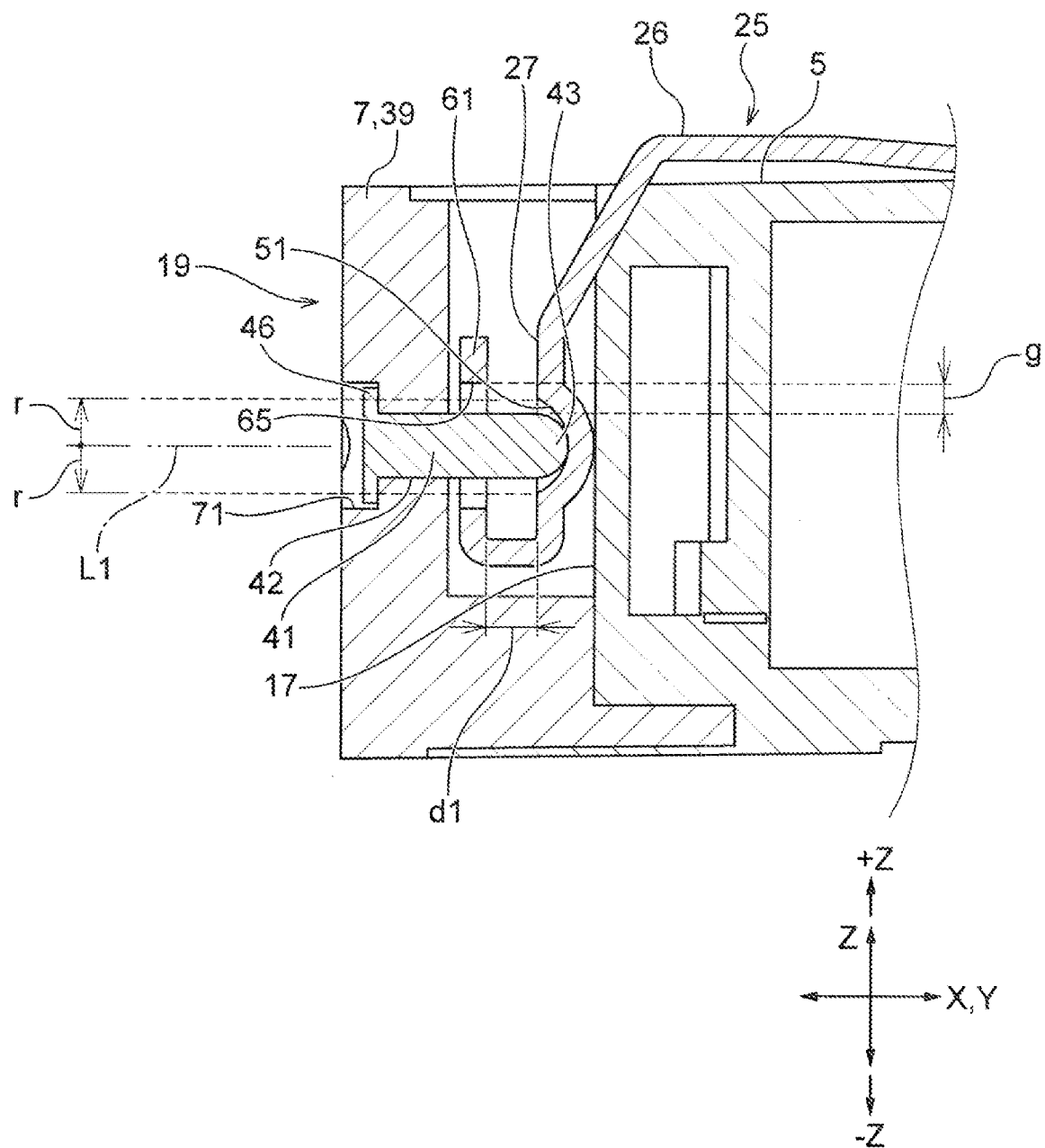
FIG. 7 is an enlarged cross-sectional view illustrating a portion of a first support unit according to the first embodiment of the present invention.

As illustrated in FIG. 7, in the first embodiment, the first support unit 19 includes a first rod-like support member 41 fixed to the fixed body 7 and a first contact unit 51 arranged in the first-support-unit extending unit 27 of the gimbal frame 25, the first contact unit 51 contacting the first rod-like support member 41. The first rod-like support member 41 includes a first leading end 43 contacting in the state of being elastically pressed against the first contact unit 51. This configuration may be reversed (described later).

Figure 8:
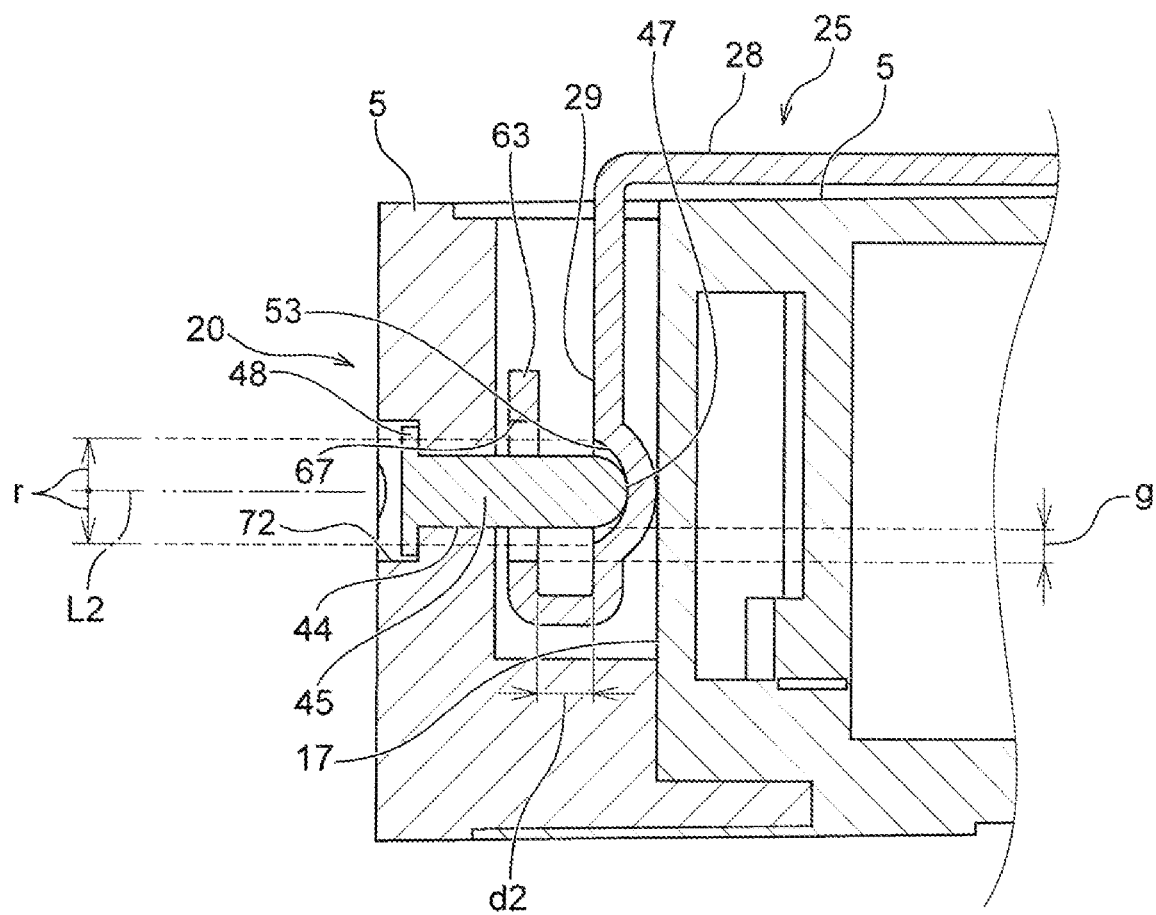
FIG. 8 is an enlarged cross-sectional view illustrating a portion of a second support unit according to the first embodiment of the present invention.
Figure 9:
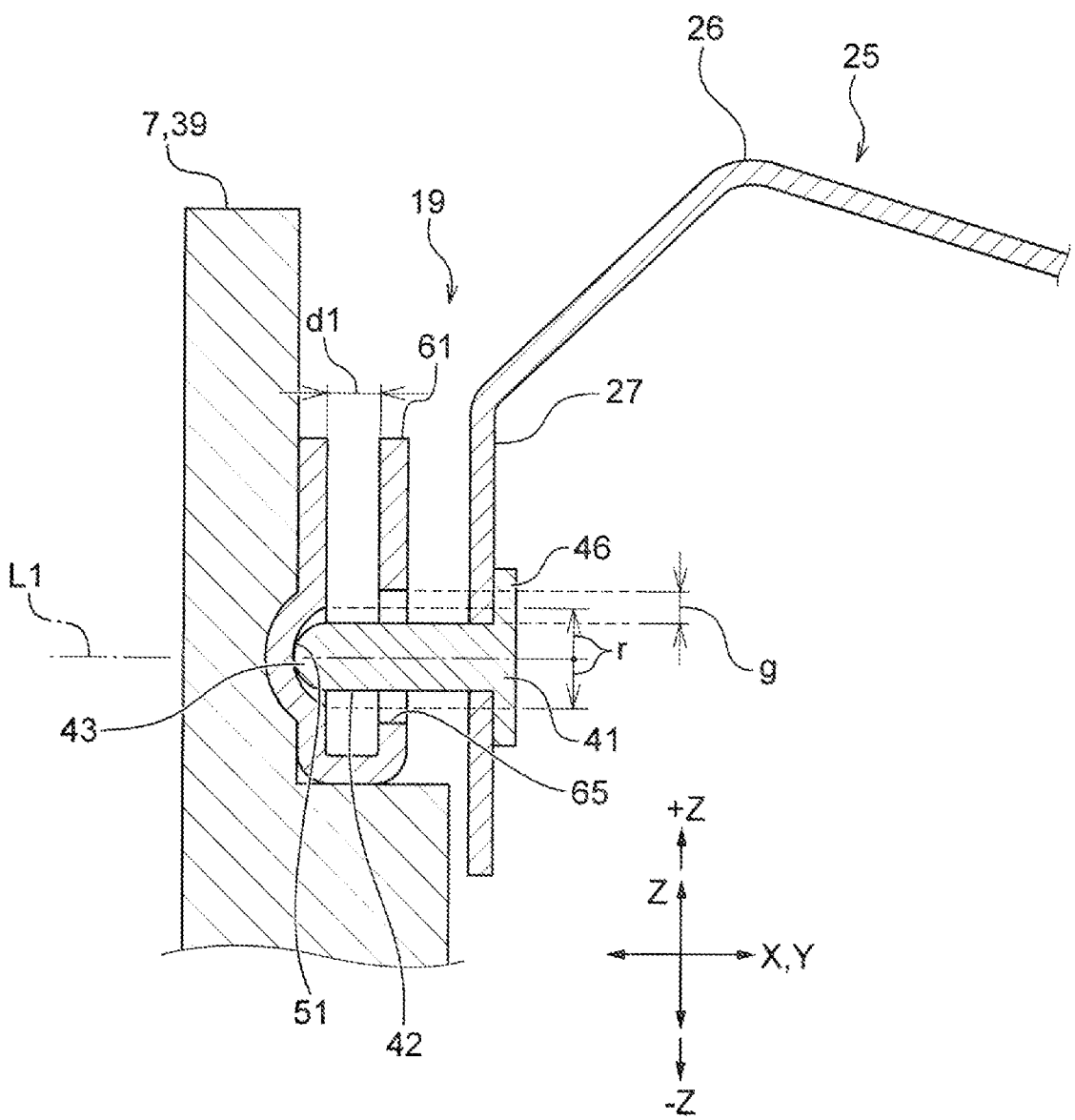
FIG. 9 is an enlarged cross-sectional view corresponding to FIG. 7 according to a second embodiment of the present invention.

As illustrated in FIG. 8, in the first embodiment, the second support unit 20 includes a second rod-like support member 45 fixed to the frame body 17 of the movable body 5 and a second contact unit 53 arranged in the second-support-unit extending unit 29 of the gimbal frame 25, the second contact unit 53 contacting the second rod-like support member 45. The second rod-like support member 45 includes a second leading end 47 contacting in the state of being elastically pressed against the second contact unit 53.

Here, the "being elastically pressed against" is realized based on the spring property imparted to the gimbal frame 25.

In the first embodiment, the first rod-like support member 41 includes a first flange 46 at a base end. The fixed body 7 is provided with a first concave unit 71 capable of comfortably accommodating the first flange 46. When the first rod-like support member 41 is fixed with an adhesive to the fixed body 7, the presence of the first flange 46 increases an adhesive area, and as a result, an adhesive strength can be increased.

Similarly, the second rod-like support member 45 includes a second flange 48 at the base end. The frame body 17 of the movable body 5 is provided with a second concave unit 71 capable of comfortably accommodating the second flange 48. When the second rod-like support member 45 is fixed with an adhesive to the frame body 17 of the movable body 5, the presence of the second flange 48 increases an adhesive area, and as a result, an adhesive strength can be increased.

It is noted that the first rod-like support member 41 and the second rod-like support member 45 may be fixed by using another method other than the adhesive, including clamping. In a case of being fixed by clamping, edges of the first concave unit 71 and the second concave unit 72 are crushed inward to fix the first rod-like support member 41 and the second rod-like support member 45.

In the first embodiment, the first rod-like support member 41 includes a first extending unit 42 extending from a base end toward the first leading end 43 and the first extending unit 42 includes a first restricting unit 61 configured to restrict a range in which the gimbal frame 25 is displaced with respect to the first contact unit 51 in the Z direction, which is a direction intersecting with the direction in which the first extending unit 42 extends. That is, the first extending unit 42 includes the first restricting unit 61 configured to restrict a range in which when the gimbal frame 25 is deformed, the first extending unit 42 is displaced with respect to the first contact unit 51 in the Z direction that is a direction intersecting with the direction in which the first extending unit 42 extends.

Similarly, the second rod-like support member 45 includes a second extending unit 44 extending from a base end toward the second leading end 47, and the second extending unit 44 includes a second restricting unit 63 configured to restrict a range in which the gimbal frame 25 is displaced with respect to the second contact unit 53 in the Z direction, which is a direction intersecting with the direction in which the second extending unit 44 extends. That is, the second extending unit 44 includes the second restricting unit 63 configured to restrict a range in which when the gimbal frame 25 is deformed, the second extending unit 44 is displaced with respect to the second contact unit 53 in the Z direction, which is a direction intersecting with the direction in which the second extending unit 44 extends.

In the first embodiment, the first contact unit 51 and the first restricting unit 61 are formed as an integrated member. Specifically, the first contact unit 51 and the first restricting unit 61 are formed as an integrated member by bending the leading end of the first-support-unit extending unit 27 of the gimbal frame 25 into a U-shape.

Similarly, the second contact unit 53 and the second restricting unit 63 are formed as an integrated member. Specifically, the second contact unit 53 and the second restricting unit 63 are formed as an integrated member by bending the leading end of the second-support-unit extending unit 29 of the gimbal frame 25 into a U-shape.

The first contact unit 51 and the first restricting unit 61 are formed as the integrated member, and thus, it is possible to reduce the number of components. Similarly, the second contact unit 53 and the second restricting unit 63 are formed as the integrated member, and thus, it is possible to reduce the number of components.

It is noted that the first contact unit 51 and the first restricting unit 61 may be formed as separate members to be an integrally coupled, instead of being formed as the integrated member. Further, the first contact unit 51 and the first restricting unit 61 may be separately provided without being integrally coupled.

In the first embodiment, the first extending unit 42 of the first rod-like support member 41 is formed in a column-like shape, and the first restricting unit 61 includes an annular first hole 65. The first extending unit 42 of the first rod-like support member 41 is arranged at a center of the first hole 65.

Similarly, the second extending unit 44 of the second rod-like support member 45 is formed in a cylinder-like shape, and the second restricting unit 63 includes an annular second hole 67. The second extending unit 44 of the second rod-like support member 45 is arranged at a center of the second hole 67.

In the first embodiment, the first leading end 43 of the first rod-like support member 41 has a convex curved surface shape while the first contact unit 51 has a concave curved surface shape. The concave curved surface shape of the first contact unit 51 ensures a stabled position as a pivoting fulcrum when the movable body 5 pivots around the first axial line L1. It is noted that the first contact unit 51 may have a flat surface shape instead of the concave curved surface; however, in a case of the flat surface shape, the first leading end 43 of the first rod-like support member 41 is desirably structured so that an amount by which the first leading end 43 of the first rod-like support member 41 shifts from the position as the fulcrum is restricted to a predetermined amount.

Further, the convex curved surface shape of the first leading end 43 of the first rod-like support member 41 ensures a stabled position as a pivoting fulcrum when the movable body 5 pivots around the first axial line L1.

Similarly, the second leading end 47 of the second rod-like support member 45 has a convex curved surface shape while the second contact unit 53 has a concave curved surface shape. The concave curved surface shape of the second contact unit 53 ensures a stabled position as a pivoting fulcrum when the movable body 5 pivots around the second axial line L2. It is noted that the second contact unit 53 may have a flat surface shape instead of the concave curved surface, but in a case of the flat surface shape, the second leading end 47 of the second rod-like support member 45 is desirably structured so that an amount by which the second leading end 47 of the second rod-like support member 45 shifts from the position as the fulcrum is restricted to a predetermined amount.

Further, the convex curved surface shape of the second leading end 47 of the second rod-like support member 45 ensures a stabled position as a pivoting fulcrum when the movable body 5 pivots around the second axial line L2.

As illustrated in FIG. 7, in the first embodiment, a radius of curvature of the concave curved surface of the first contact unit 51 is formed to be larger than a radius of curvature of the convex curved surface of the first leading end 43. Further, a gap g between the first restricting unit 61 and the first extending unit 42 of the first rod-like support member 41 is formed to be smaller than a radius r of a circle of an opening edge of the concave curved surface.

Similarly, as illustrated in FIG. 8, a radius of curvature of the concave curved surface of the second contact unit 53 is formed to be larger than a radius of curvature of the convex curved surface of the second leading end 47. Further, a gap g between the second restricting unit 63 and the second extending unit 44 of the second rod-like support member 45 is formed to be smaller than a radius r of a circle of an opening edge of the concave curved surface.

Figure 5:
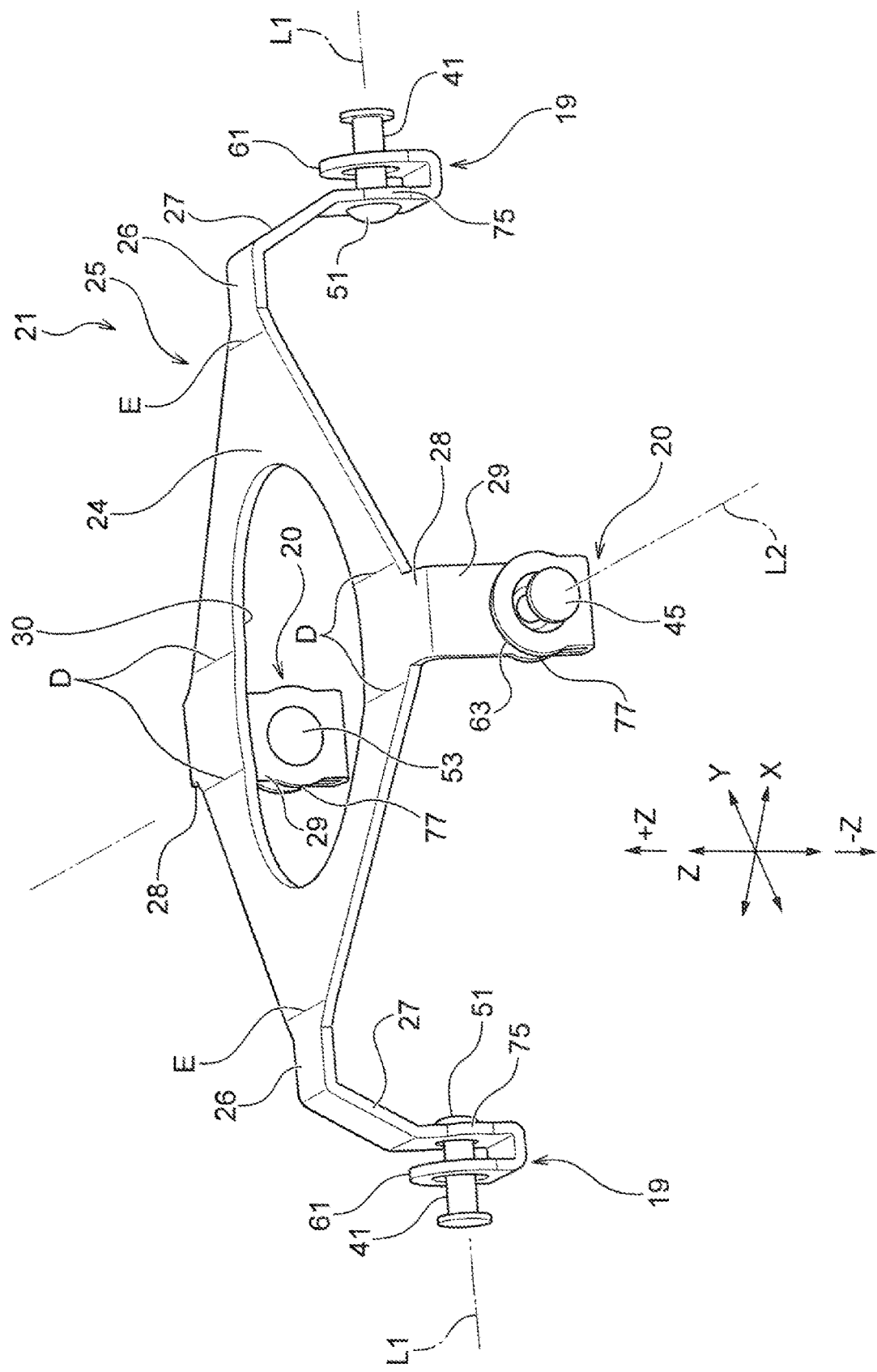
FIG. 5 is a perspective view illustrating a gimbal frame portion of a support mechanism obtained by removing a movable body from FIG. 2 according to the first embodiment of the present invention.
Figure 6:
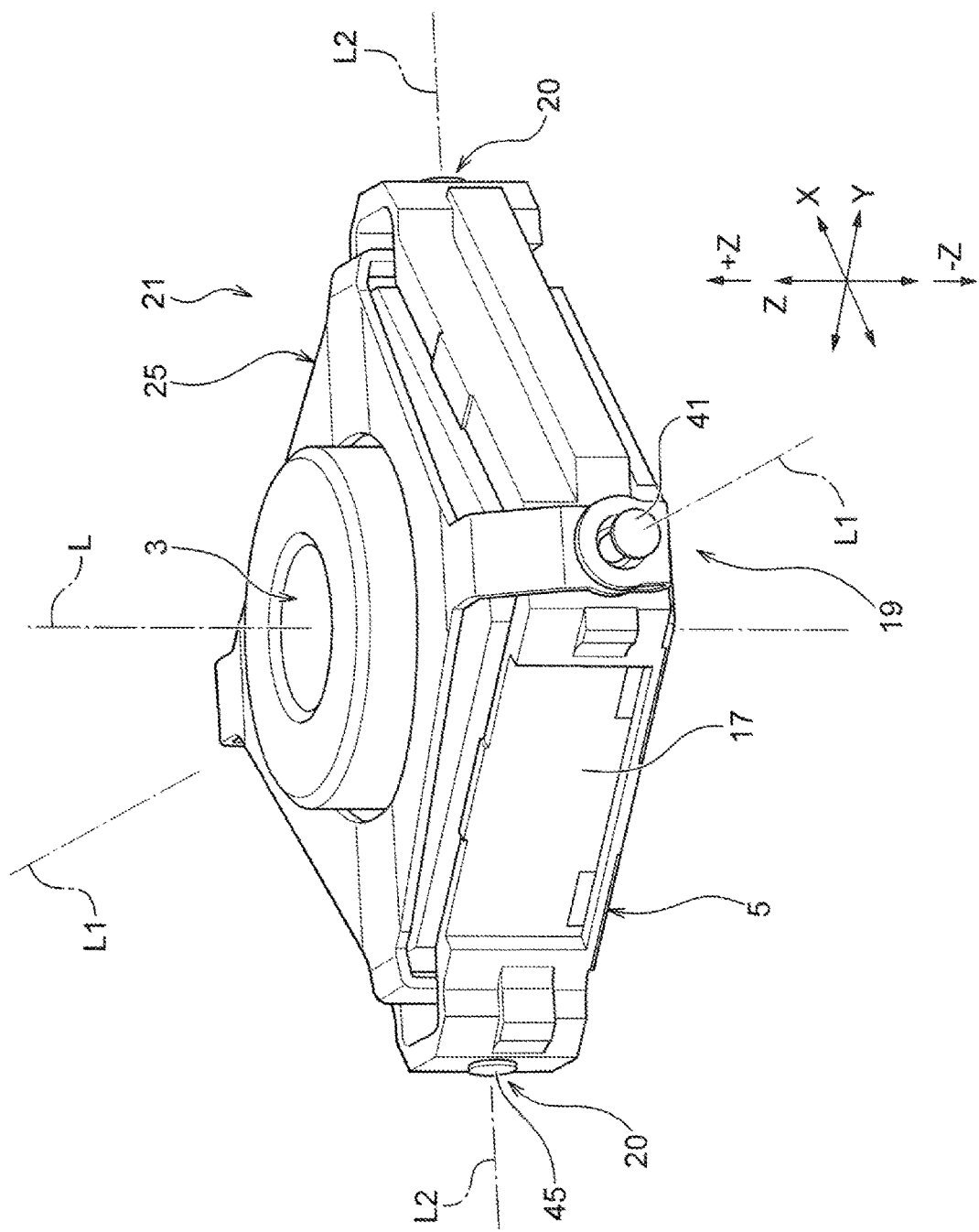
FIG. 6 is a perspective view of the same state as in FIG. 3, but viewed in a different direction from FIG. 3.

In the first embodiment, as illustrated in FIG. 5, the first contact unit 51 includes a first reinforcement unit 75 around the opening edge of the concave curved surface. Similarly, the second contact unit 53 includes a second reinforcement unit 77 around the opening edge of the concave curved surface.

As a result, a strength of a concave curved surface portion of the first contact unit 51 can be increased by the first reinforcement unit 75. Similarly, a strength of a concave curved surface portion of the second contact unit 53 can be increased by the second reinforcement unit 77.

Further, in the first embodiment, the first leading end 43 of the first rod-like support member 41 is shaped in a convex curved surface, and a distance d1 in a direction in which the first extending unit 42 extends between the first contact unit 51 and the first restricting unit 61 is formed to be equal to or more than the radius of curvature of the convex curved surface of the first leading end 43.

As a result, the distance d1 in the direction in which the first extending unit 42 extends between the first contact unit 51 and the first restricting unit 61 is equal to or more than the radius of curvature of the convex curved surface of the first leading end 43, and thus, if an impact is applied to the optical unit 1, the first leading end (convex curved surface) 43 of the first rod-like support member 41 is not easily removed from the first contact unit (concave curved surface) 51. As a result, it is possible to prevent the first rod-like support member 41 from being removed from the first restricting unit 61.

Similarly, the second leading end 47 of the second rod-like support member 45 is shaped in a convex curved surface, and a distance d2 in a direction in which the second extending unit 44 extends between the second contact unit 53 and the second restricting unit 63 is formed to be equal to or more than the radius of curvature of the convex curved surface of the second leading end 47.

As a result, the distance d2 in the direction in which the second extending unit 44 extends between the second contact unit 53 and the second restricting unit 63 is equal to or larger than the radius of curvature of the convex curved surface of the second leading end 47, and thus, if an impact is applied to the optical unit 1, the second leading end (convex curved surface) 47 of the second rod-like support member 45 is not easily removed from the second contact unit (concave curved surface) 53. Consequently, it is possible to prevent the second rod-like support member 45 from being removed from the second restricting unit 63.

Second Embodiment

A second embodiment of the present invention will be described with reference to FIG. 9.

In the second embodiment, in the first support unit 19, the first rod-like support member 41 is fixed with an adhesive to the first-support-unit extending unit 27 of the gimbal frame 25. On the other hand, the first contact unit 51 is fixed with an adhesive to the fixed body 7. That is, the fixing positions of the first rod-like support member 41 and the first contact unit 51 are opposite to those in the first embodiment. Other configurations are in much the same way as those in the first embodiment.

In the second support unit 20, the fixing positions of the second rod-like support member 45 and the second contact unit 53 may also be opposite to those in the first embodiment.

Description of Effects of First and Second Embodiments

According to each of the embodiments, the first support unit 19 configured to rotatably support the movable body 5 around the first axial line L1 on the fixed body 7 includes the first rod-like support member 41 fixed to one of the fixed body 7 and the gimbal frame 25 and the first contact unit 51 being provided in the other of the fixed body 7 and the gimbal frame 25 and contacting the first rod-like support member 41. As a result, with a structure where the rod-like support member 41, instead of welding the conventional ball, is fixed to a predetermined location, fixing is easy by using the rod-like portion, and thus, the assembly workability is improved.

In addition, the fulcrum of the support used when the movable body 5 is displaced with respect to the fixed body 7 can be manufactured by processing a leading end of the rod-like support member 41 into a desired shape, and thus, the manufacturability is improved.

According to the above-described embodiments, the second support unit 20 configured to rotatably support the movable body 5 around the second axial line L2 on the gimbal frame 25 includes the second rod-like support member 45 fixed to one of the movable body 5 and the gimbal frame 25, and the second contact unit 53 being provided in the other of the movable body 5 and the gimbal frame 25 and contacting the second rod-like support member. Thus, in the second support unit 20 between the movable body 5 and the gimbal frame 25 similarly to the first support unit 19, fixing is easy by using the rod-like portion, and thus, the assembly workability is improved.

Further, according to the above embodiments, the extending units 42 and 44 of the rod-like support members 41 and 45 include the restricting units 61 and 63 configured to restrict the ranges displaced with respect to the contact units 51 and 53 in directions intersecting with the directions in which the extending units 42 and 44 extend. Consequently, if an impact is applied to the optical unit 1, it is possible to prevent a case where the support units 19 and 20 are removed so that the movable body 5 and the support mechanism 21 are dropped.

Further, when lengths or fixing positions of the extending units 42 and 44 are adjusted, a pressurization in the support mechanism 21 can be easily adjusted.

Further, according to the above embodiments, the distances d1 in directions in which the extending units 42 and 44 extend between the contact units 51 and 53 and the restricting units 61 and 63 are equal to or more than the radii of curvature of the convex curved surfaces of the leading ends 43 and 47. Consequently, if an impact is applied to the optical unit 1, it is possible to prevent the rod-like support members 41 and 45 from being removed also from the restricting units 61 and 63.

According to the above embodiments, the gap g between the restricting units 61 and 63 and the extending units 42 and 44 of the rod-like support members 41 and 45 are smaller than the radius r of the circle of the opening edge of the concave curved surfaces of the contact units 51 and 53. Consequently, even if an impact is applied to the optical unit 1 to bring the rod-like support members 41 and 45 into contact with the restricting units 61 and 63, it is possible to prevent the rod-like support members 41 and 45 from being removed from the concave curved surfaces.

Further, according to the above embodiments, the extending units 42 and 44 of the rod-like support members 41 and 45 have a column-like shape, and the restricting units 61 and 63 have an annular shape. As a result, distances between the rod-like support members 41 and 45 and the restricting positions of the restricting units 61 and 63 are equal in all directions, and thus, the regulation can provide an equal effect of preventing removal in all the directions.

Further, according to the above embodiments, the fixed body 7 is arranged to surround the gimbal frame 25. Thus, a structure is employed in which the pressurization of the support mechanism 21 can be adjusted from the fixed body 7 side, and thus, the pressurization can be easily adjusted.

Another Embodiment

The optical unit 1 according to at least an embodiment of the present invention has basically the configuration as described above; however, it is of course possible to partially modify or omit the configuration within the spirit of the invention of the present application.

The optical module 3 is not limited to the camera module described in the embodiments, but may be another module such as a laser irradiation module or an optical sensor module. If the optical module 3 has another shape such as a cylinder-like shape, shapes of the frame body 17, the yoke 35 and the like may be made to match the shape of the optical module 3.

What is claimed is:

1. An optical unit, comprising:
a movable body including an optical module;
a fixed body configured to displaceably hold the movable body; and
a support mechanism including a gimbal frame configured to rotatably support the movable body with respect to the fixed body around a first axial line intersecting with a direction of an optical axis direction of the optical module and around a second axis line intersecting with the direction of the optical axis and a direction of the first axial line, wherein
the support mechanism comprises:
a first support unit provided at two positions on the first axial line with the optical axis interposed therebetween, so that the movable body is rotatably supported around the first axial line with respect to the fixed body; and
a second support unit provided at two positions on the second axial line with the optical axis interposed therebetween, so that the movable body is rotatably supported around the second axial line with respect to the gimbal frame,
wherein the first support unit comprises:
a first rod-like support member fixed to one of the fixed body and the gimbal frame, the first rod-like support member being extended in the direction of the first axial line; and
a first contact unit being provided in the other one of the fixed body and the gimbal frame and contacting the first rod-like support member in the direction of the first axial line,
the first rod-like support member includes a first leading end, the first leading end contacting with the first contact unit in a state of being elastically pressed against the first contact unit in the direction of the first axial line, and
the first leading end and the first contact unit are structured as a pivoting fulcrum when the movable body pivots around the first axial line,
wherein the second support unit comprises:
a second rod-like support member fixed to one of the movable body and the gimbal frame, the second rod-like support member being extended in a direction of the second axial line; and a second contact unit being provided in the other one of the movable body and the gimbal frame and contacting the second rod-like support member in the direction of the second axial line, wherein
the second rod-like support member includes a second leading end, and the second leading end contacts with the second contact unit in a state of being elastically pressed against the second contact unit in the direction of the second axial line, and
the second leading end and the second contact unit are structured as a pivoting fulcrum when the movable body pivots around the second axial line,
wherein the movable body is rotatably supported around the first axial line by the first support unit provided at the two positions on the first axial line with the optical axis interposed therebetween, and the movable body is rotatably supported around the second axial line by the second support unit provided at the two positions on the second axial line with the optical axis interposed therebetween.

2. The optical unit according to claim 1, wherein the first rod-like support member includes a flange at a base end.

3. The optical unit according to claim 1, wherein the first rod-like support member includes an extending unit extending from a base end toward the first leading end, and
the extending unit includes a restricting unit configured to restrict a range in which the gimbal frame is displaced with respect to the first contact unit in a direction intersecting with a direction in which the extending unit extends.

4. The optical unit according to claim 3, wherein the first leading end of the first rod-like support member has a convex curved surface shape, and
a distance in a direction in which the extending unit extends between the first contact unit and the restricting unit is equal to or larger than a radius of curvature of the convex curved surface.

5. The optical unit according to claim 3, wherein the first leading end of the first rod-like support member has a convex curved surface shape,
the first contact unit has a concave curved surface shape,
a radius of curvature of the concave curved surface is larger than a radius of curvature of the convex curved surface, and
a gap between the restricting unit and the extending unit of the first rod-like support member is smaller than a radius of a circle of an opening edge of the concave curved surface.

6. The optical unit according to claim 5, wherein the first contact unit includes a reinforcement unit around the opening edge of the concave curved surface.

7. The optical unit according to claim 3, wherein the first contact unit and the restricting unit are formed as an integrated member.

8. The optical unit according to claim 3, wherein the extending unit of the first rod-like support member has a col like shape, and
the restricting unit has an annular shape.

9. The optical unit according to claim 1, wherein the fixed body is arranged to surround the gimbal frame.

* * * * *